(12) United States Patent
Inagaki

(10) Patent No.: US 7,716,509 B2
(45) Date of Patent: May 11, 2010

(54) STORAGE AND ACCESS CONTROL METHOD FOR STORAGE

(75) Inventor: Yukihide Inagaki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 943 days.

(21) Appl. No.: 11/453,644

(22) Filed: Jun. 14, 2006

(65) Prior Publication Data

US 2006/0282696 A1 Dec. 14, 2006

(30) Foreign Application Priority Data

Jun. 14, 2005 (JP) .............................. 2005-173259

(51) Int. Cl.
*G06F 12/14* (2006.01)
(52) U.S. Cl. .............................. 713/400; 726/2; 726/26; 726/27; 713/600; 713/601; 711/100
(58) Field of Classification Search ................. 713/600, 713/601
See application file for complete search history.

(56) References Cited

U.S. PATENT DOCUMENTS

| 5,300,874 | A  | * | 4/1994 | Shimamoto et al. ......... 320/106 |
| 7,134,144 | B2 | * | 11/2006 | McKune ...................... 726/26 |
| 2002/0017977 | A1 | * | 2/2002 | Wall .......................... 340/5.28 |
| 2002/0067571 | A1 |   | 6/2002 | Yoshida et al. |
| 2003/0105890 | A1 |   | 6/2003 | Sakuma |
| 2004/0215909 | A1 | * | 10/2004 | Imai et al. ................... 711/163 |
| 2006/0050622 | A1 | * | 3/2006 | So et al. ................... 369/275.1 |

FOREIGN PATENT DOCUMENTS

| JP | 2002-268951 | 9/2002 |
| JP | 2002-366031 | 12/2002 |
| JP | 2003-258792 | 9/2003 |
| JP | 2004-086494 | 3/2004 |

* cited by examiner

*Primary Examiner*—Thomas Lee
*Assistant Examiner*—Fahmida Rahman
(74) *Attorney, Agent, or Firm*—Townsend and Townsend and Crew LLP; Patrick Duncan

(57) ABSTRACT

Embodiments of the invention prevent a storage from being continuously used in a state in which the time of a built-in clock is different from the actual time because of replacement of a battery or intentional tampering of time. In one embodiment, a storage having a recording medium for storing content data includes: a clock that can refer to present time and can set time to reliable standard time on the outside (time synchronization); a built-in power supply that supplies power to the clock; and a nonvolatile memory that records time when the time synchronization for the clock is performed. The storage compares, according to circumstances, the present time indicated by the built-in clock and the time when the time synchronization is performed last time and, when it is made clear that the time synchronization is not performed for time longer than a fixed time set in advance, prohibits an access to a limited access area of the recording medium.

18 Claims, 5 Drawing Sheets

STORAGE AND ACCESS CONTROL METHOD FOR STORAGE

CROSS-REFERENCES TO RELATED APPLICATIONS

This application claims priority from Japanese Patent Application No. JP2005-173259, filed Jun. 14, 2005, the entire disclosure of which is incorporated herein by reference.

BACKGROUND OF THE INVENTION

The present invention relates to a storage, in which a recording medium such as a magnetic disk and a control device for accessing this recording medium are integrated, and an access control method for such a storage. In particular, the invention relates to a technique of preventing time tampering of a built-in clock and preventing illegal accesses.

Among storages, a magnetic disk device is put to practical use as a built-in storage for information apparatuses such as a computer and digital home appliances because a large capacity of device can be realized relatively easily. In order to digitally store content data, which is likely to include a copyright, such as video data, music, and still images in a storage, it is necessary to apply a copyright protection technique for the storage or a host terminal apparatus using the storage such that unlimited copying and use are not performed. In particular, when it is necessary to set an expiration date on the content data, it is necessary to refer to reliable time in order to compare the time with expiration date information set on the content data. Except where it is possible to always make connection to a reliable clock through a safe path without intervention of artificiality, it is likely that, in a constitution including a battery-driven clock such as a portable apparatus, deviation of the clock accumulates according to elapse of a long time or the clock cannot tick away the minutes normally because of exhaustion of the battery. Therefore, it is essential to provide a mechanism for referring to more reliable time and setting time immediately after replacing the battery or when deviation of time increases. If, for example, a user is allowed to use such a mechanism for setting time of an internal clock freely, there is a problem in that time is likely to be tampered by a malicious user. It is also likely that a user acts in an artificial way to prevent the built-in clock from functioning normally by setting an exhausted battery intentionally or removing a battery.

As measures to solve the problems, for example, patent document 1 (JP-A-2004-86494) discloses an example in which a user is not allowed to operate synchronizing means for a built-in clock freely and safe communication is established between a reliable standard time server and the synchronizing means. Patent document 2 (JP-A-2002-366031) describes a clock that can be operated only in a determined procedure in synchronization with time acquired on a network. Moreover, patent document 3 (JP-A-2003-258792) describes a system in which client apparatuses connected to a server authenticate time among the clients to make it difficult to commit fraudulence in time authentication. As a system for judging whether synchronization of a built-in clock is necessary, patent document 4 (JP-A-2003-167788) describes a system that, when the built-in clock is not in a reliable state, makes this built-in clock "invalid" to thereafter prevent the built-in clock from being referred to by processing that requires time reference.

It is also possible to perform expiration date management in a host system apparatus that handles a storage in which the content data is recorded. In this case, expiration date information is read out from the storage to the host system apparatus and compared with the present time. Then, propriety of use of a content is determined according to judgment of the host system apparatus. In any case, the content data and information essential for use of the data such as an encryption key can be read out from the storage regardless of the present time. In particular, in a portable storage, it is likely that the expiration date management in the host system apparatus is not performed and the content data flows out to the outside. There is a problem in that system design is complicated in terms of copyright protection or protection intensity decreases. Thus, it is conceivable to adopt a method of setting a clock for measuring time inside a storage and of counting time for an expiration date for a recorded content using this clock. For example, patent document 5 (JP-A-2002-268951) describes a storage incorporating a counter and an oscillator for driving the counter and a battery for supplying power to the counter and the oscillator.

BRIEF SUMMARY OF THE INVENTION

Even in the storage described in patent document 5, inconsistency occurs in expiration date management when it is attempted to, in replacing a battery, reset a counter after replacing the battery and, then, use a content recorded in advance. Even when a value is continued to be held such that the counter is not reset according to the replacement of the battery, there is still a problem in terms of convenience of use in that, for example, an access authority cannot be recovered again for a content that is judged as expired by mistake because of progression of the counter.

A problem that the invention is to solve is that, in a copyright protection system that manages an expiration date of a content used in an apparatus mainly used offline, if a time synchronizing mechanism for a clock incorporated on the apparatus side is provided, it is likely that artificial time tampering is performed.

It is a feature of the invention to provide a storage that prevents time tampering for a built-in clock and prevents illegal accesses.

It is another feature of the invention to provide an access control method for a storage that prevents illegal accesses.

The invention provide a storage having a recording medium for storing content data, characterized mainly by including: a clock that can refer to the present time and can set time to a reliable standard time on the outside (time synchronization); a built-in power supply that supplies power to the clock; and a nonvolatile memory that records the time when the time synchronization for the clock is performed, and in that the storage compares, according to circumstances, the present time indicated by the built-in clock and the time when the time synchronization is performed last time and, when it is made clear that the time synchronization is not performed for time longer than a fixed time set in advance, prohibits an access to an entire area or a limited access area of the recording medium.

According to the invention, since it is possible to prevent time tampering for the built-in clock, it is possible to prevent illegal accesses to the storage.

DETAILED DESCRIPTION OF THE INVENTION

Figure 1:
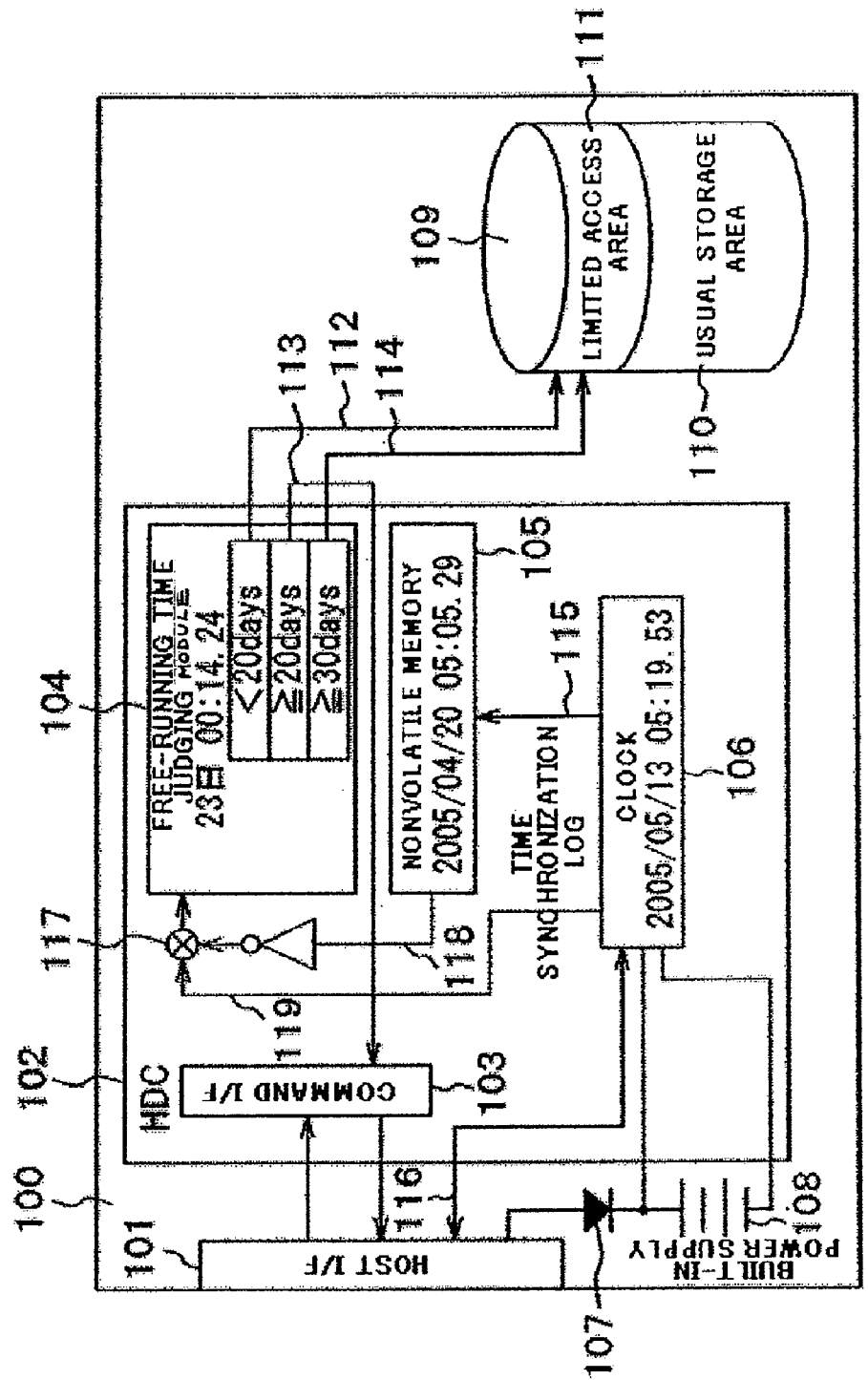
FIG. 1 is a block diagram of a storage according to a first embodiment of the invention.

FIG. 1 is a block diagram of a storage according to a first embodiment of the invention. Reference numeral 100 denotes a storage such as a magnetic disk device, a flash memory device, or an optical disk device. The storage 100 is used while being connected to or incorporated in a host apparatus such as an information processing apparatus like a computer, a music reproducing apparatus, or a moving image reproducing apparatus. Reference numeral 101 denotes a host interface for making connection to the host apparatus. Reference numeral 102 denotes a control device and is equivalent to, when the storage 100 is a magnetic disk device, a hard disk controller. Reference numeral 103 denotes a command interface, which interprets a command inputted from a host apparatus on the outside through the host interface 101 and outputs a return value through the host interface 101 after appropriate processing. Reference numeral 104 denotes a free-running time judging module (judging apparatus) that judges whether inputted time information is larger or smaller than time (a threshold value) set in advance. Reference numeral 105 denotes a nonvolatile memory that has a capacity for recording at least date and time. Reference numeral 106 denotes a clock that measures time including year, month, and day. Reference numeral 108 is a built-in power supply, which is a primary cell, a chargeable secondary cell, a fuel cell, or the like. Reference numeral 107 denotes a power supply switch, which supplies, when the storage 100 cannot receive power supply from the outside, power to the clock 106 and necessary sections from the built-in power supply 108 and, when the storage 100 is supplied with power from the outside, supplies the power to the clock 106 and the like. As shown in FIG. 1, the power supply switch 107 can be easily realized by OR-connecting a power supply line from the outside with the built-in power supply 108 via a diode. If the built-in power supply 108 is a chargeable secondary cell, this constitution can be a charging circuit. However, a protection circuit at the time of charging and a protection circuit in the case in which the built-in battery 108 is a primary cell are not shown in the figure.

Reference numeral 109 denotes a recording medium, which is equivalent to a magnetic disk or an optical disk when the storage 100 is a magnetic disk device or the optical disk device and is equivalent to a flash memory when the storage 100 is a flash memory device. In the recording medium 109, a recording area is divided into a usual storage area 110 and a limited access area 111. The usual storage area 110 is an area from which data can be read and in which data can be written according to a usual access from the outside of the storage 100. The limited access area 111 is an area to which an access such as reading and writing cannot be simply performed from the outside of the storage 100 and is an anti-tamper area that requires equipment authentication before an access. In order to access this area, a procedure decided in advance such as equipment authentication or encryption session establishment is required between the host apparatus and the storage 100.

The clock 106 continues to always operate with power supplied by the power supply switch 107 while the storage 100 is supplied with power from the host apparatus on the outside through the host interface 101 and with power supplied from the built-in power supply 108 when power is not supplied from the outside. Time information of the clock 106 includes year, month, and day. This clock 106 can perform time synchronization 116 by referring to standard time on the outside of the storage 100 through the host interface 101. In this case, it is desirable that a not-shown standard time clock and the built-in clock 106 perform equipment authentication or establish encryption session with each other to prevent time synchronization with an unexpected clock or tampering of synchronization information. When time synchronization is performed, the storage 100 writes present date and time in the nonvolatile memory 105 as a time synchronization log 115 using the built-in clock 106 that is just synchronized with the standard time clock. This writing may be updated by overwriting every time as long as a latest time synchronization log is left.

This time synchronization log recorded in the nonvolatile memory 105 is outputted at certain appropriate timing (118). A difference between the time synchronization log and a present time output 119 from the clock 106 is calculated by a time subtracting module (subtracter) 117. This difference between the present time 119 and the time synchronization log 118 is inputted to the free-running time judging module 104. The free-running time judging module 104 compares inputted time information with a threshold value set in advance and performs several classifications. For example, the free-running time judging module 104 classifies the inputted time information into three types: time exceeding thirty days (first threshold value), time exceeding twenty days (second threshold value) and less than thirty days, and time less than twenty days. When the inputted time information exceeds thirty days, the control device 102 prohibits (114) an access from the outside to the limited access area 111 of the recording medium 109. This means that, even if an access to the limited access area 111 through the host interface 101 is requested from the host apparatus on the outside, the control device 102 returns a status of processing interruption or error to the host apparatus and does not perform an access to the limited access area 111 as requested.

When a judgment result of the free-running time judging module 104 indicates time exceeding twenty days and less than thirty days, the control device 102 warns (113) the host apparatus on the outside that, if time synchronization of the clock 106 remains not performed, an access to the limited access area 111 from the outside of the storage will be prohibited.

When a judgment result of the free-running time judging module 104 indicates time less than twenty days, the control device 102 releases (112) the prohibition of an access to the limited access area 111 to make it possible to access the limited access area 111 even from the outside of the storage 100 if correct authentication and encryption procedures are completed.

Note that the judgment on a difference between a time synchronization log and present time may be performed at a fixed time interval such as every twelve hours or may be performed every time an access to the limited access area 111 is requested from the host apparatus on the outside.

Figure 2:
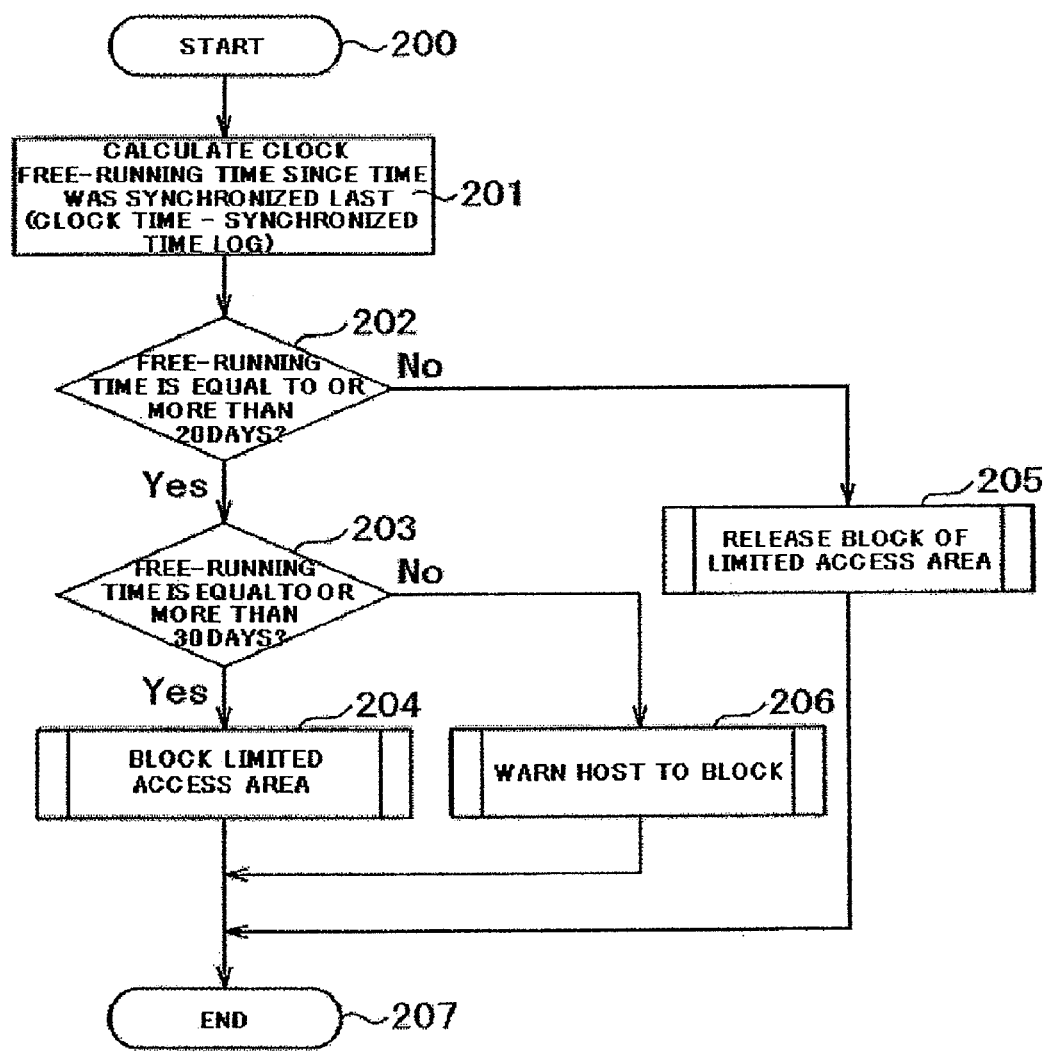
FIG. 2 is a flowchart showing an operation procedure of the storage according to the first embodiment.

FIG. 2 is a flowchart showing an operation procedure for free-running time judgment concerning the clock 106 incorporated in the storage 100. At the start of processing (step 200), the storage 100 differentiates time information obtained from the clock 106 and time synchronization log information stored in the nonvolatile memory 105 using the time subtracting module 117 and inputs a difference to the self-running time judging module 104 (step 201). When it is judged that self-running time is less than twenty days (step 202), the storage 100 releases block of an access request to the limited access area 111 and permits an access according to an original decided procedure (step 205). When self-running time exceeds twenty days, the storage 100 further judges whether the self-running time exceeds thirty days (step 203). When the self-running time is less than thirty days, the storage 100 only issues a warning to the host apparatus (step 206). When the self-running time exceeds thirty days, the storage 100 blocks the limited access area 111 and performs processing for prohibiting an access from the host apparatus on the outside (step 204). The storage 100 ends the series of operations for the self-running time judgment (207). Note that, although the limited access area is blocked in the embodiment described above, the invention is not limited to this and the entire recording area may be closed.

According to the first embodiment, if the built-in clock is left without setting time over a fixed period or more, a part of a recording area cannot be accessed. Thus, for example, if fixed form information essential for using main data such as encryption and decryption keys and conditions for use of contents is stored in this area, the area is blocked according to judgment on whether time of the built-in clock is reliable before managing expiration dates set for the respective contents. A user is motivated to set time for the built-in clock at least every fixed period.

Figure 3:
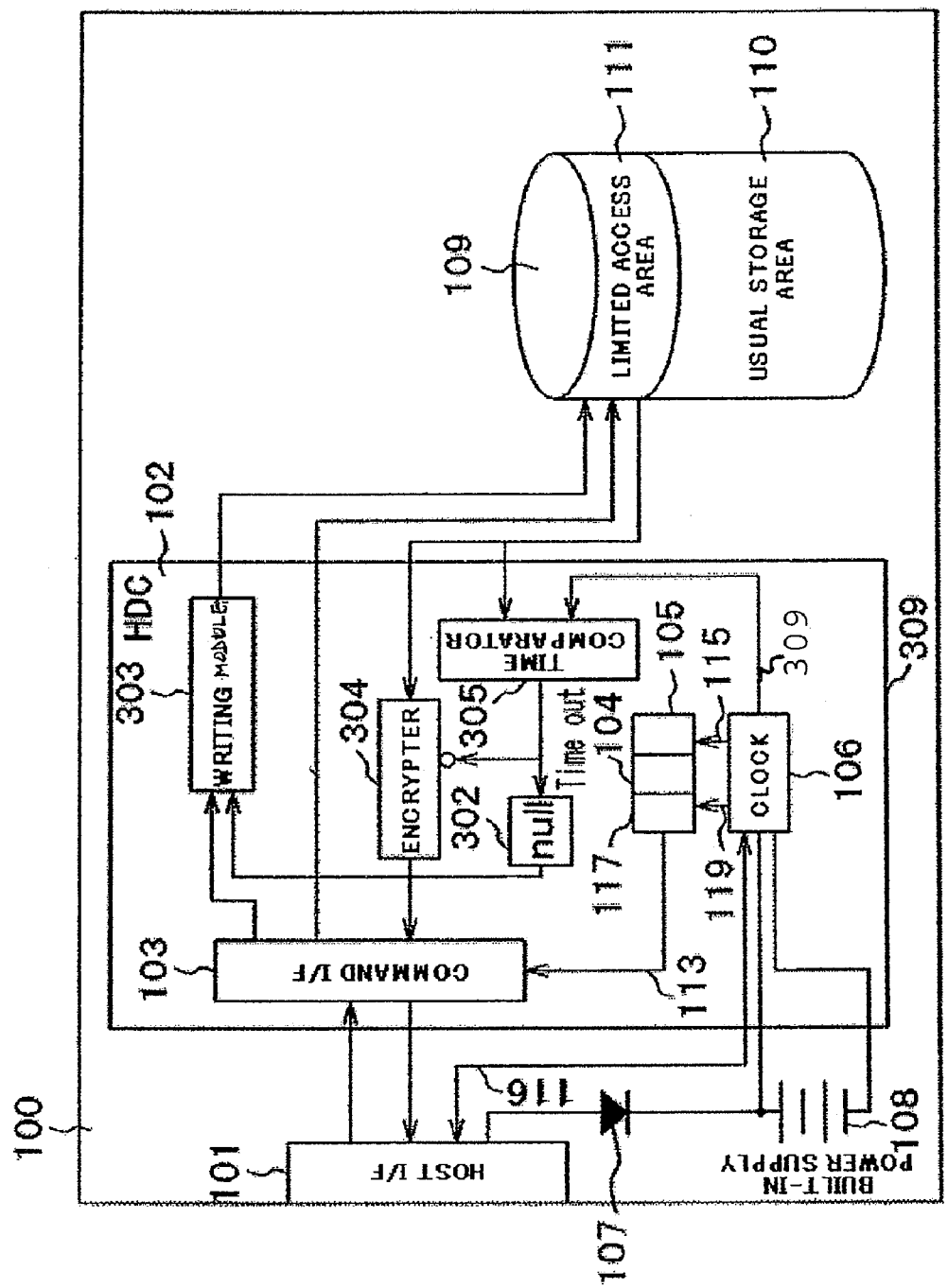
FIG. 3 is a block diagram of a storage according to a second embodiment of the invention.

FIG. 3 is a block diagram of a storage according to a second embodiment. This embodiment is based on the first embodiment. The same components as those in the first embodiment are shown in a simplified form. Reference numeral 302 denotes null data prepared as a fixed value in advance. Reference numeral 303 denotes a limited writing module (writing device) that applies writing control to the limited access area 111. Conversely, reference numeral 304 denotes a data encrypter for reading out information recorded in the limited access area 111 to the outside of the storage 100. Reference numeral 305 denotes a time comparator that compares two kinds of time information.

Figure 4:
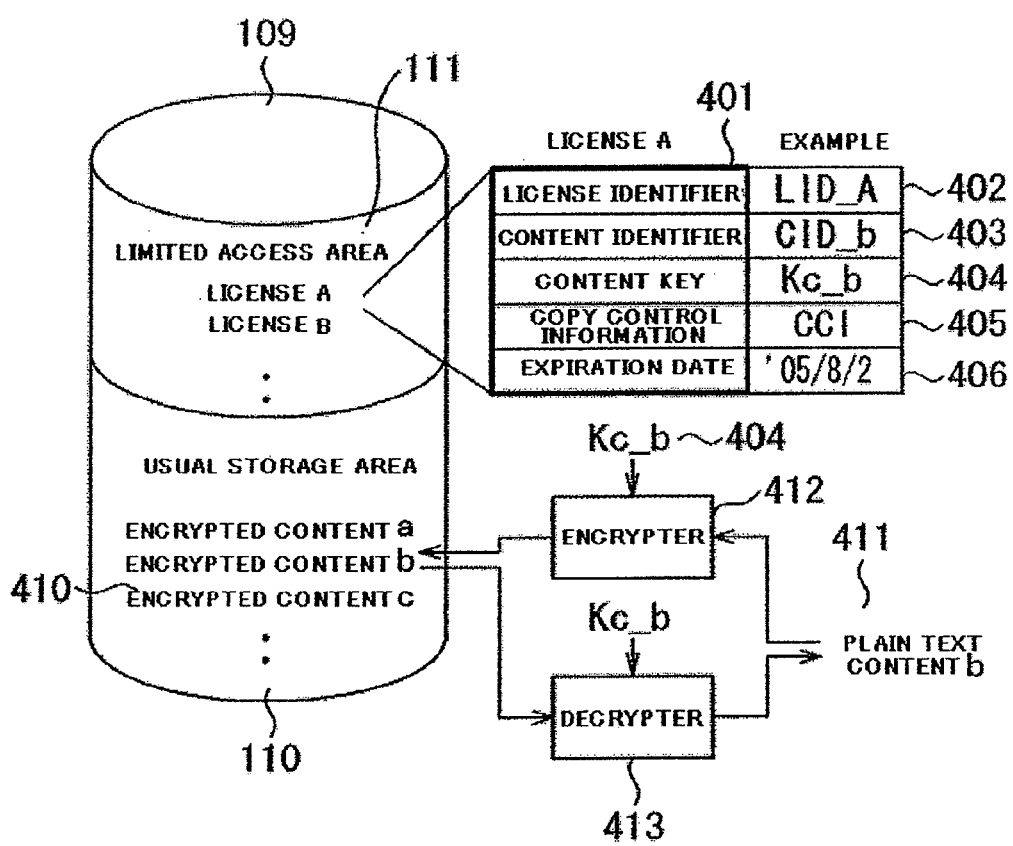
FIG. 4 is a diagram showing a recording area and recorded contents of a recording medium.

FIG. 4 is a conceptual diagram showing recorded contents and a recording area of the recording medium 109 present in the storage 100. As an example of a method of digitally recording video and music content data, copyrights of which are required to be protected, the content data may be encrypted and recorded in the recording medium 109. For example, when a content b (411) initially present in plain text is subjected to an encrypter 412 with a content key Kc_b (404) acted thereon, the content b (411) changes to an encrypted content b (410). This encrypter 412 only has to be provided in an apparatus on the outside (e.g., a host PC or a reproduction apparatus) separate from the storage 100.

The encrypted content b (410) is recorded in the usual storage area 110 together with other content data encrypted by other content keys. The usual storage area 110 can be accessed from the outside of the storage 100 freely at any time. However, actually, the encrypted content b (410) cannot be used effectively because the content is encrypted. In order to use the encrypted content b (410), it is necessary to use the content key Kc_b (404), which is used in encrypting the content, as a decryption key. The content key Kc_b (404) is included in fixed form information called a license A (401) and stored in the limited access area 111.

The license A (401), which is fixed form information, includes, other than the content key Kc_b (404), a license identifier LID_A (402) for identifying the license itself, a content identifier CID_b (403) for identifying a content that is an object of the license, copy control information CCI (405) for the content, and an expiration date 406 of the content.

The copy control information 405 describes control information on whether a use authority for the object content can be copied or moved to other apparatuses. An apparatus or a device using the encrypted content b (410) has to acquire the license A (401) corresponding to this content and obtain the content key Kc_b (404). In order to read out the license A (401), it is necessary that equipment authentication, establishment of an encryption session, and the like necessary for an access to the limited access area 111 can be performed. It is possible to limit a device, which gives the authority, in advance. A device, which has acquired the license A (401) extracts the content key Kc_b (404) from the license A (401) and inputs the content key Kc_b (404) to a decrypter 413 together with the encrypted content b (410) to obtain the plain text content b (411). This decrypter 413 only has to be a device that uses the content finally and is mounted on an apparatus on the outside (e.g., a host PC or a reproduction apparatus) unrelated to the storage 100.

Referring back to FIG. 3, when the license information (fixed form information) described above is written, the license information, which enters the storage 100 through the encryption session established already, passes through the host interface 101 and the command interface 103 and is decrypted in the limited writing module 303 to be plain text license information and recorded in a predetermined location of the limited access area 111. When the license information is read out, the license information is temporarily read out to the encrypter 304 for readout processing from the limited access area 111. In the encrypter 304, the license information is encrypted to be able to pass through the encryption session established already and outputted to the outside of the storage 100 through the command interface 103 and the host interface 101.

In this embodiment, the free-running time judgment explained in the first embodiment is performed. When an access to the limited access area 111 is requested from an apparatus on the outside in a state in which an access to the limited access area 111 is permitted, the license information read out from the limited access area 111 is sent to the encrypter 304 and, at the same time, expiration date information in the license information is inputted to the time comparator 305 and compared with present time 309 outputted from the clock 106. When the present time 309 has reached the expiration date 406, an instruction to stop is issued to the encrypter 304 to stop the output of the license information to the outside of the storage 100 according to the encryption session. Moreover, the null data 302 is sent to the limited access area 111 through the limited writing module 303 and overwritten on expired license information to delete the license information.

Figure 5:
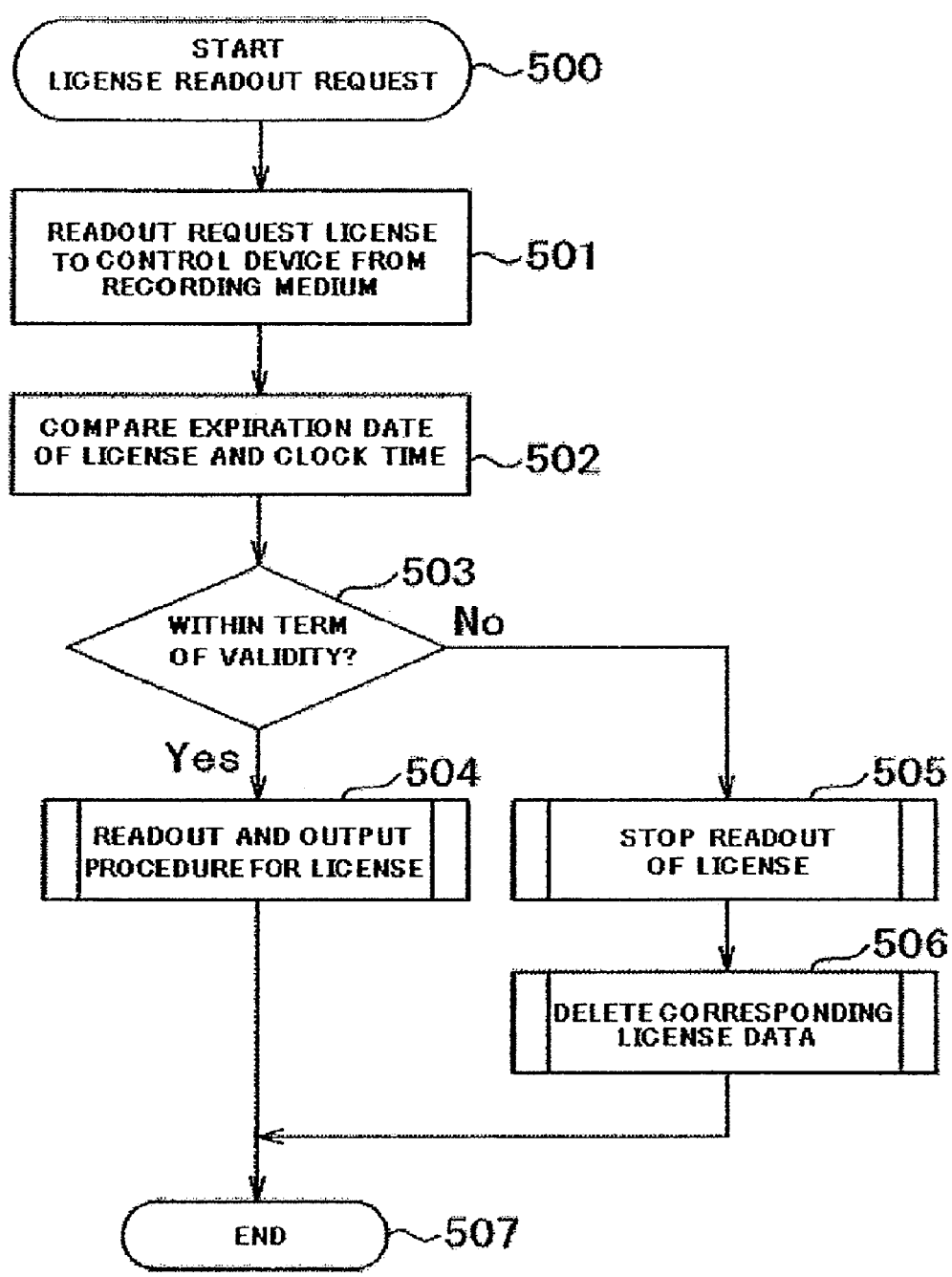
FIG. 5 is a flowchart showing an operation procedure of the storage according to the second embodiment.

FIG. 5 is a flowchart showing an operation procedure in the case in which a request for reading out a license is sent from the outside of the storage 100. A series of procedure begins at a point when a request for reading out the license A (401) is received from the outside of the storage 100 (step 500). The storage 100 reads out the requested license A (401) to the control device 102 from the recording medium 109 (step 501). The storage 100 compares the expiration date 406 of the license A (401) with the present time 309 of the clock 106 (502). If the present time 309 has not reached the expiration date 406 (503), the storage 100 continues output processing for the license readout request (step 504). If the present time 309 has exceeded the expiration date 406, the storage 100 stops the output processing for the license readout request (step 505), deletes the license A (506), and ends the series of processing (step 507).

According to the second embodiment, it is guaranteed that time of the built-in clock is set at least in a decided fixed period. Thus, it is possible to compare an expiration date of each content and present time in the storage on the basis of this built-in clock and, when the present time exceeds the expiration date, stop readout of license information indispensable for use of the content such as a content key. Moreover, it is possible to realize a system that does not output license information indispensable for use of content to the outside of the storage by, for example, deleting a license after stopping output processing for license information.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A storage, comprising:
   a recording medium;
   a built-in power supply;
   a clock that can operate with power from the built-in power supply or an external power supply and set time to standard time;
   a nonvolatile memory that stores time when the clock sets time; and
   a subtracter that outputs time, which has elapsed since time setting was performed last, on the basis of the time setting time stored in the nonvolatile memory and time information obtained from the clock,
   wherein when the output of the subtracter exceeds a predetermined fixed time, the storage blocks an entire recording area or a part of the recording area of the recording medium against a readout request from an apparatus on outside;
   wherein a threshold value smaller than the fixed time is further set in advance and, when the output of the subtracter is between the threshold value and the fixed time, the storage warns the apparatus on the outside that time setting for the clock is necessary.

2. The storage according to claim 1 wherein, when the output of the subtracter does not exceed the threshold value, the storage releases the block for the entire recording area or the part of the recording area of the recording medium.

3. The storage according to claim 1, wherein the recording medium has a limited access area and a usual recording area, and the block against a readout request from the apparatus on the outside is applied to the limited access area.

4. The storage according to claim 3, wherein the limited access area is an anti-tamper area for which equipment authentication is necessary prior to an access.

5. The storage according to claim 3, wherein content data is recorded in the usual recording area, and license information of the content data is recorded in the limited access area.

6. An access control method for a storage, comprising:
   calculating time, which has elapsed since time setting was performed last, on the basis of present time of a clock, which can operate with power supply from a built-in power supply or an external power supply and set time to standard time, and time when the time setting is performed;
   judging whether the elapsed time exceeds a second threshold value smaller than a first threshold value;
   judging, when the elapsed time exceeds the second threshold value, whether the elapsed time exceeds the first threshold value;
   blocking, when the elapsed time exceeds the first threshold value, a limited access area of a recording medium against an access request from an apparatus on outside;
   warning, when the elapsed time exceeds the second threshold value and does not exceed the first threshold value, the apparatus on the outside that time setting for the clock is necessary; and
   releasing, when the elapsed time does not exceed the second threshold value, the blocking for the limited access area of the recording medium.

7. The access control method according to claim 6, wherein the limited access area is an anti-tamper area for which equipment authentication is necessary prior to an access.

8. The access control method according to claim 6, wherein the recording medium has the limited access area and a usual recording area, and the block against a readout request from the apparatus on the outside is applied to the limited access area, and wherein content data is recorded in the usual recording area, and license information of the content data is recorded in the limited access area.

9. A storage, comprising:
   a recording medium having a limited access area, in which fixed form information including an expiration date is stored, in a part of a recording area;
   a built-in power supply;
   a clock that can operate with power from the built-in power supply or an external power supply and set time to standard time;
   a nonvolatile memory that stores time when the clock sets time;
   a subtracter that outputs time, which has elapsed since time setting was performed last, on the basis of the time setting time stored in the nonvolatile memory and time information obtained from the clock;
   a judging device that permits an access to the limited access area of the recording medium when the output of the subtracter does not exceed a preset fixed time; and
   a time comparator that compares the expiration date included in the fixed form information, which is read out after the judging device permit the access, and present time obtained from the clock,
   wherein when the present time does not reach the expiration date, the storage continues readout of the fixed form information and, when the present time reaches the expiration date, the storage stops the readout of the fixed form information;
   wherein a threshold value smaller than the preset fixed time is further set in advance and, when the output of the subtracter is between the threshold value and the preset fixed time, the storage warns an apparatus on outside that time setting for the clock is necessary.

10. The storage according to claim 9, wherein the storage erases the fixed form information after the readout of the fixed form information is stopped.

11. The storage according to claim 9, wherein the fixed form information comprises license information for content data stored in the recording medium.

12. The storage according to claim 11, wherein the license information includes encryption and decryption keys for the content data stored in the recording medium.

13. The storage according to claim 11, wherein the license information includes copy control information for the content data stored in the recording medium.

14. An access control method for a storage, comprising:
   calculating time which has elapsed since time setting was performed last, on the basis of present time of a clock, which can operate with power supply from a built-in power supply or an external power supply and set time to standard time, and time when the time setting is performed;

judging whether the elapsed time exceeds a second threshold value smaller than a first threshold value;

judging, when the elapsed time exceeds the second threshold value, whether the elapsed time exceeds the first threshold value;

blocking, when the elapsed time exceeds the first threshold value, a limited access area of a recording medium against an access request from an apparatus on outside;

warning, when the elapsed time exceeds the second threshold value and does not exceed the first threshold value, the apparatus on the outside that time setting for the clock is necessary;

releasing, when the elapsed time does not exceed the second threshold value, the blocking for the limited access area of the recording medium;

reading out, when the block of the limited access area is released and a readout request is applied to the limited access area, fixed form information recorded in the limited access area;

comparing expiration date included in the fixed form information and present time obtained from the clock;

continuing, when the present time does not reach the expiration date, the readout of the fixed form information; and stopping, when the present time reaches the expiration date, the readout of the fixed form information.

15. The access control method for the storage according to claim 14, further comprising erasing the fixed form information after stopping the readout of the fixed form information.

16. The access control method for the storage according to claim 14, wherein the fixed form information is license information for content data stored in the recording medium.

17. The access control method for the storage according to claim 16, wherein the license information includes encryption and decryption keys for the content data stored in the recording medium.

18. The access control method for the storage according to claim 16, wherein the license information includes copy control information for the content data stored in the recording medium.

* * * * *